(12) United States Patent
Gupta et al.

(10) Patent No.: US 8,370,182 B2
(45) Date of Patent: Feb. 5, 2013

(54) METHOD AND APPARATUS FOR MEASURING PRODUCT SHIPMENT PROCESS CAPABILITY

(75) Inventors: Aman Gupta, Milwaukee, WI (US); Amit Maheshwari, Brookline, MA (US); James A. Yenerich, Pewaukee, WI (US)

(73) Assignee: General Electric Company, Schenectady, NY (US)

( * ) Notice: Subject to any disclaimer, the term of this patent is extended or adjusted under 35 U.S.C. 154(b) by 3579 days.

(21) Appl. No.: 09/747,645

(22) Filed: Dec. 22, 2000

(65) Prior Publication Data

US 2002/0123943 A1 Sep. 5, 2002

(51) Int. Cl.
*G06F 17/30* (2006.01)
(52) U.S. Cl. ........................................... 705/7.11
(58) Field of Classification Search ............... 705/1, 28, 705/29, 7, 7.11; 707/104.1
See application file for complete search history.

(56) References Cited

U.S. PATENT DOCUMENTS

| 5,230,075 | A | | 7/1993 | Premerlani et al. | |
|---|---|---|---|---|---|
| 5,369,570 | A | * | 11/1994 | Parad | 705/7.13 |
| 5,809,479 | A | * | 9/1998 | Martin et al. | 705/11 |
| 5,819,291 | A | | 10/1998 | Haimowitz et al. | |
| 5,826,252 | A | | 10/1998 | Wolters, Jr. et al. | |
| 6,032,121 | A | * | 2/2000 | Dietrich et al. | 705/7.22 |
| 2002/0156694 | A1 | * | 10/2002 | Christensen et al. | 705/26 |

OTHER PUBLICATIONS

"Ford Revamps Exclusice Web Site for Suppliers"; Oct. 1999; PR Newswire, p4560; Dialog file 16, Accession No. 06716956.*
Deleryd, Mats; "On the Gap between theory and practice of process capability studies", 1998, The International Journal of Quality and Reliability Management, Bradford, vol. 15, Iss. 2 p. 178.*
"A SAS Institute White Paper: The Quality Data Warehouse—serving the analytical needs of the manufacturing enterprise", © 1999, SAS Institute, pp. 1-11.*
Davis, Robert D; et al.; "Detecting Process Shifts with X-bar charts", First Quarter 1993, Production and Inventory Management Journal, 34, 1, ABI/INFORM Global, p. 25.*
Harry, Mikel J; "Six Sigma: A breakthrough strategy for profitability", May 1998, Quality Progress, 31, 5; ABI/INFORM Global, p. 60.*
Benchmarking field services using a zero defects approach Ravi S. Behara, Jos G.A.M. Lemmink. The International Journal of Quality & Reliability Management. Bradford:1997. vol. 14, Iss. 5, p. 512-526.*
Six sigma, e-commerce pose new challenges Jenny Kendall, Donna O Fulenwider. Quality Progress. Milwaukee:Jul. 2000. vol. 33, Iss. 7, p. 31-37 (7 pp.).*
The power of Six Sigma in practice David Hutchins. Quality Focus. Bradford:Second Quarter 2000. vol. 4, Iss. 2, p. 26-33 (8 pp.).*

(Continued)

*Primary Examiner* — Romain Jeanty
(74) *Attorney, Agent, or Firm* — Ziolkowski Patent Solutions Group, SC

(57) ABSTRACT

A system and method for automatically assessing the process quality capability of a shipping process is disclosed. The system monitors data on a database that is being constantly updated with information about shipment requests and shipment dates for various products. From that data, a statistical calculation is performed and the results are indicated on an Internet or intranet electronic page. The statistical calculation is designed to indicate the capabilities of the current process to deliver products to customers on time.

27 Claims, 7 Drawing Sheets

OTHER PUBLICATIONS

Metrics for the Order Fulfillment Process (part 1) Arthur M Schneiderman, Journal of Cost Management. Summer 1996, vol. 10. No. 2, p. c1-13. retrieved from the web at: www.schneiderman.com/AMS_publications/Metrics%20for%20Order%20Fulfillment/OTD-1.doc.*

An Overview of Operational Excellence and Six Sigma in AlliedSignal Stephen A Zinkgraf, 1998, Quality Congress. ASQ's Annual Quality Congress Proceedings; ABI/INFORM Global. p. 173.*

Defect Rate Estimation for "Six Sigma" Processes Timothy S Vaughn, Fourth Quarter 1998, Production and Inventory Management Journal, 39, 4; ABI/INFORM Global, p. 5.*

AlliedSignal Soars by building up suppliers Tim Minahan, Purchasing. Boston; Sep. 18, 1997. vol. 123, Iss. 4, p. 38 9 pgs.*

The Rise, Fall and Revival of Six Sigma Rob McClusky, Quality Focus; Second Quarter 2000; 4, 2; ABI/INFORM Global, p. 6.*

SPC Software (800)635-5901 IQS, retrieved from web.archive.org's webpage of IQS.com from Oct. 6, 2000, pp. 1-2.*

Using dashboards and scorecards in a service industry Steven J Pautz. Quality Congress. ASQ's . . . Annual Quality Congress Proceedings. Milwaukee:1998. p. 324 (7 pp.).*

Best practices: The joy of Six (Sigma) Robert J Bowman. Distribution. Radnor:Aug. 1997. vol. 96, Iss. 9, p. 62-67 (4 pp.).*

* cited by examiner

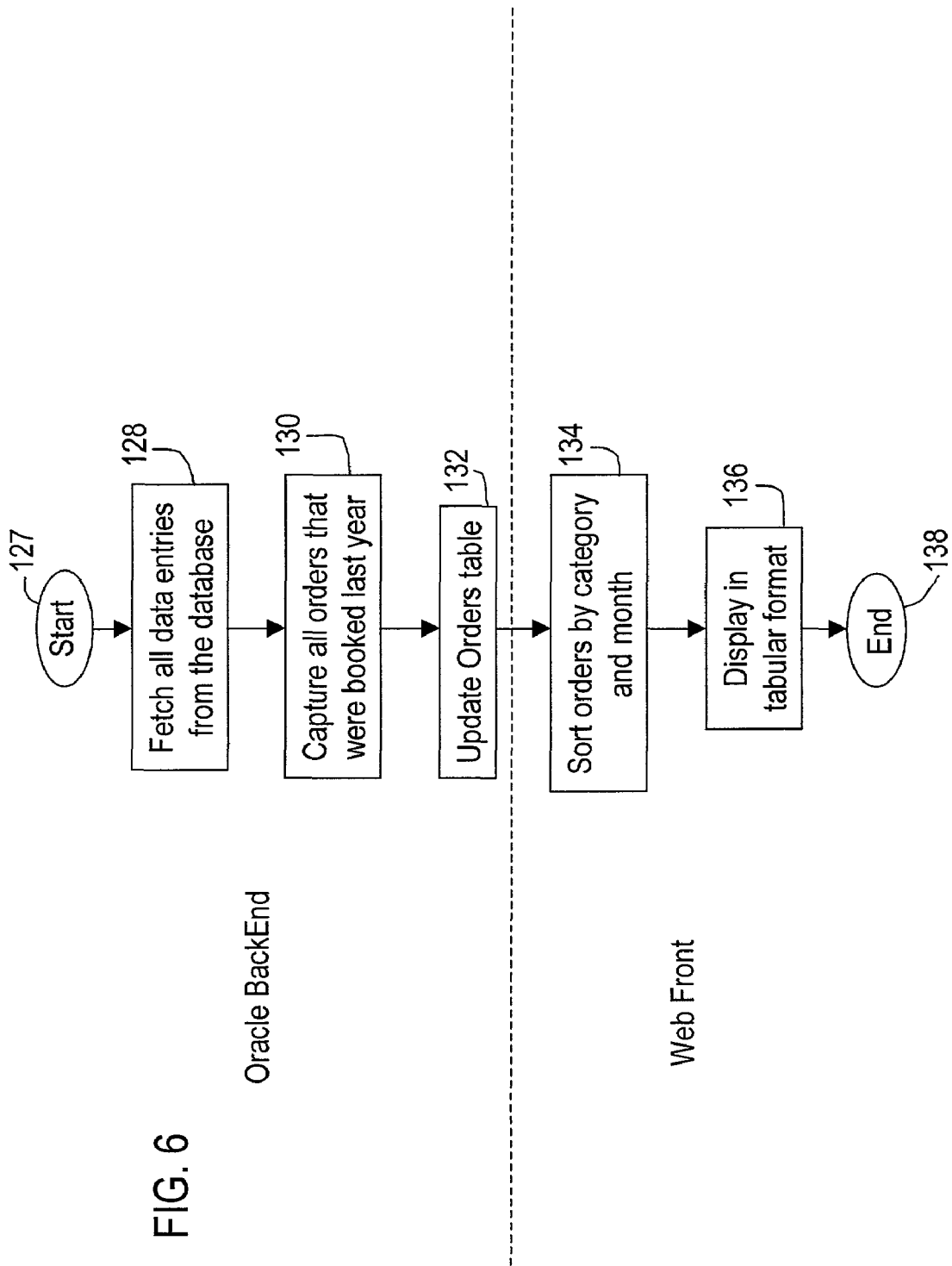

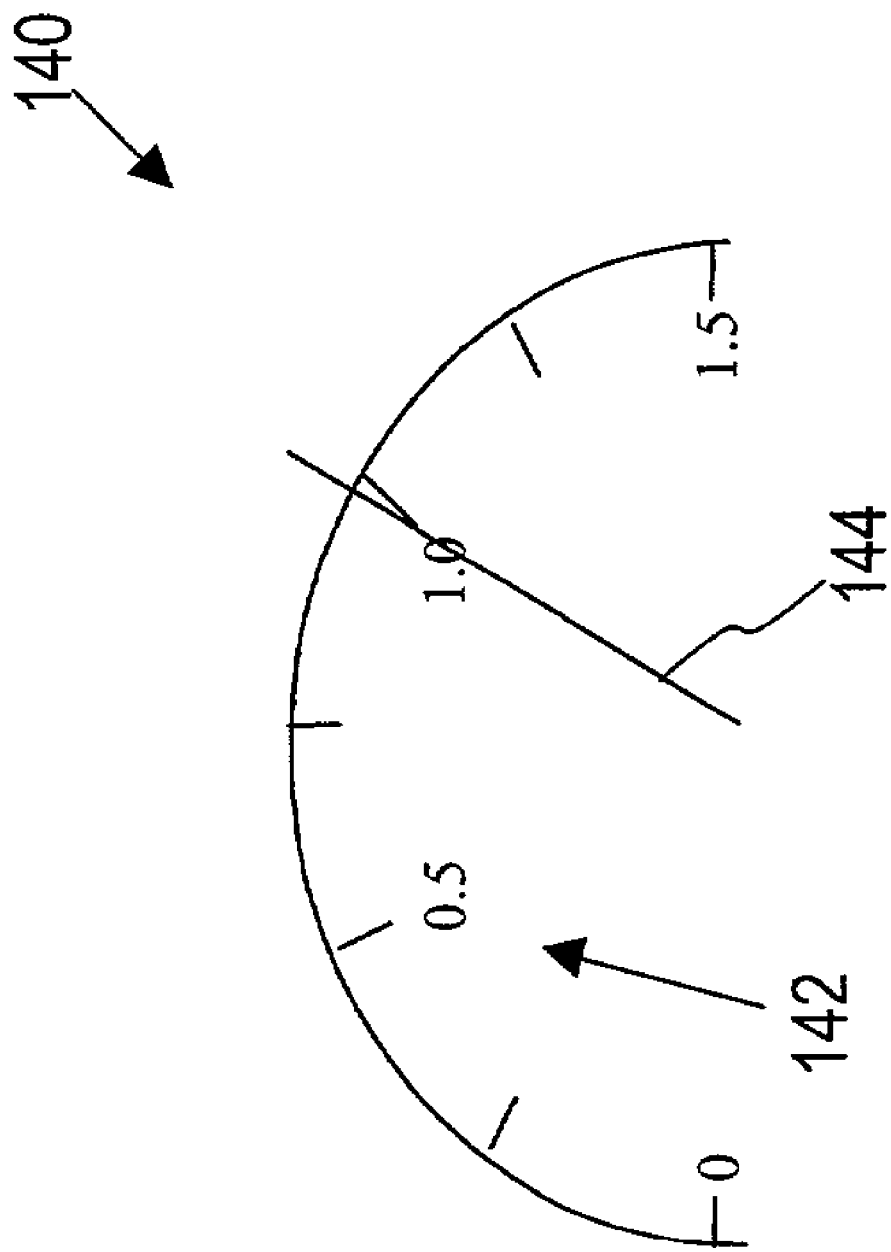

METHOD AND APPARATUS FOR MEASURING PRODUCT SHIPMENT PROCESS CAPABILITY

BACKGROUND OF THE INVENTION

The present invention relates generally to the use of statistics to measure the performance and performance capabilities of a process, and more particularly, to automated electronic reporting of the real-time results of statistical calculations intended to indicate future performance.

There have been many improvements toward attaining quality goals of any business, and a large number of those relate to manufacturing facilities and methods. For example, the quality of automobiles has steadily increased over the years in part due to improved methods for increasing the quality of the manufacturing process.

A focus on shipment timeliness quality can also improve the delivery of products or services to the customer. Customer satisfaction can hinge on basic deliverables such as on-time installation, or quick phone response when called for technical assistance. This is also true for the very simplest of business tasks like delivering the product or service when the customer was told to expect it.

In manufacturing, for example, process performance has traditionally been measured by sampling the output to ensure compliance within the specification limits. A sample of the output is taken and analyzed at the source to determine how the process is working and the adjustments that should be made if deemed necessary. This method has a number of drawbacks, not the least of which is timeliness of the information.

Process capability is provided by some well-known measurements in the art of statistics. Some generally known and accepted measurements for process capability Include: Z long-term, Z short-term, Z bench, $C_{PK}$, $C_P$, sigma value, and defects per million opportunities. Each of these values provides a measure of the capability of a process. That is, the ability of the process to produce quality output over time. Given up-to-date information, a manager or process-owner can make adjustments or further investigate ways to improve the process thereby improving the quality of the output.

It would therefore be desirable to have an electronic system able to provide information indicative of process capability on a real-time, on-demand basis.

SUMMARY OF THE INVENTION

The invention is directed to providing real-time, information about process capability, or in a time that for all practical purposes is real-time to the user. The information is to be available continuously and automatically updated at a frequency to maintain the real-time effectiveness of the information. The preferred embodiment provides the information electronically upon request to a terminal or computer that is in communication with the relevant network.

In accordance with one aspect of the invention, a method for measuring product shipment process capability is disclosed. The method uses a database that is maintained with current data and contains fields indicating an order number, a maximum ship date, a customer requested date, and a product category for each order. The maximum ship date is the date when the last piece of an order was shipped, and the customer requested date is the date when the customer requested the product to be shipped. The method requires fetching order information for all orders that have a valid maximum ship date, subtracting the customer requested date from the maximum ship date thereby producing a difference value, adding a predetermined number of days to the difference value to provide a shipment quality metric for each order, and using the shipment quality metric in a statistical calculation to indicate process quality.

In accordance with another aspect of the invention, a computer-readable medium is disclosed. The computer readable medium contains one or more computer programs that, when executed by one or more computers, causes the one or more computers to follow a number of instructions from the computer program. The one or more programs first instruct the one or more computers to query a database that contains information detailing orders, a requested delivery date, a maximum ship date, and a product category for a plurality of products. Any orders with an invalid entry for the maximum ship date or absent an entry for the maximum ship date are ignored. The one or more computers are then instructed to subtract the requested delivery date from the maximum ship date and add an adjustment value to obtain a shipment quality metric. The query, subtraction, and addition acts are repeated for a plurality of shipped products until all are processed. At this point the one or more computers process the shipment quality metrics to determine overall shipment quality.

In accordance with yet another aspect of the invention, a computer data signal is disclosed. The signal represents a sequence of instructions that, when executed by one of more processors, causes the one or more processors to accomplish a number of tasks. The tasks involve a database that is maintained with data indicating order numbers, promise dates, request dates, maximum ship dates, and a product category for a number of products. The instructions then provide for obtaining the data from each order that has a valid maximum ship date. That data is used to create an upper specification limit by adding a predetermined number of days just prior to a customer's requested delivery date, and to create a lower specification limit by adding a predetermined number of days after a customer's requested delivery date. The data signal then causes the one or more processors to compute and display a statistical value providing an indication of process capability that is then relayed in the data signal to the user.

Other features, objects, and advantages of the present invention will be made apparent by the following detailed description and drawings.

BRIEF DESCRIPTION OF THE DRAWINGS

The drawings illustrate one mode presently contemplated for carrying out the invention.

FIG. 6 is a flow chart representation of the process to display orders and revenue in accordance with another aspect of the invention.

FIG. 7 is a representation of the Z-value graphic indicator in accordance with another aspect of the invention.

DETAILED DESCRIPTION OF THE PREFERRED EMBODIMENT

In a preferred embodiment of the present invention, a program is designed to augment a commercially available database program. Specifically, it is designed as a separate program that works with data in the database. The program provides real-time, or near real-time reporting capabilities that are not available to users of the commercially available database. Other embodiments of the invention may use different hardware and/or software manifestations to embody the invention in accordance with their particular design.

Figure 1:
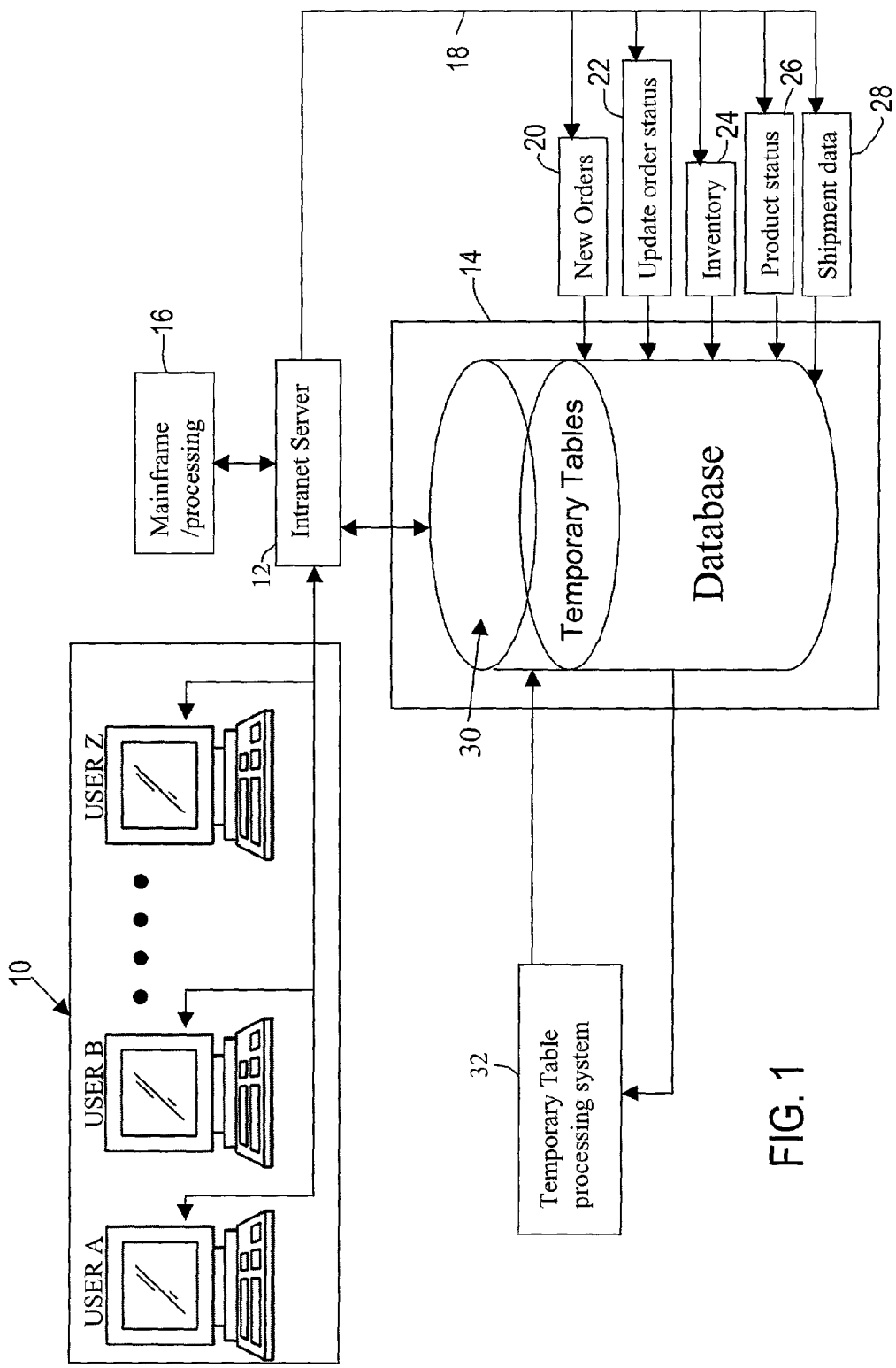
FIG. 1 is a high-level overview block diagram representing an embodiment of the invention.

Referring to FIG. 1, an overview diagram of a reporting system is shown which includes a plurality of user stations 10 such as User A, User B through User Z. These user stations 10 represent any number of users on a network at any time. The user stations 10 are connected to an Intranet server 12. This can be through direct communication, a local area network, or from another network like an intranet or the Internet. It may also include user stations 10 connected via a variety of other networking connections, including wireless connections. The Internet server 12 is in communication with database 14, which may be on another computer network. The Intranet server 12 is also communicatively connected to a mainframe/processing section 16. The Mainframe/Processing section 16 processes data from database 14 based on user requests and completes various reports and provides the reports to the user stations 10.

Database 14 contains data on orders, availability (when products will be available for shipping), requested shipping dates, actual shipping dates, promised shipping dates, revenue per order, and various other product and sales information. All of the information is constantly updated at the user stations 10, and is communicated through the Intranet server 12. Some of the users may update the information and some may merely be accessing the database for information. The boxes 20-28 in FIG. 1 show the input of this information into the database 14, indicated by data input 18. The data includes new orders 20, update order status 22, current inventory 24, product status 26, and shipment data 28.

The database 14 has the ability to reserve areas for computational results known as temporary tables 30. The tables contain the latest totals programmed to be stored therein that can be readily accessed by the users at user stations 10. It is temporary in that the temporary table processing system 32 repeatedly updates the temporary tables 30. When the data in the database 14 changes, the inputs to the temporary table processing system 32 are modified to update the information in the temporary tables 30 with new totals. In the preferred embodiment, the temporary table processing system 32 updates the data in the temporary tables 30 every 60 minutes, but the time interval can be set by the programmer. Depending on needs, the update is performed based on such factors as product turn over, product manufacture time, number of orders taken per interval, and so on. The update should be performed often enough so that users acquire real-time data based on these factors.

The preferred embodiment shown in FIG. 1 contemplates a manufacturing facility that has a number of products in various stages of completion, or a re-manufacturing facility with the same traits. Such a facility may have a system as represented by FIG. 1 merely to report the status to internal users. Additionally, an organization with these capabilities may want to make the information available to field sales personal, or even directly to potential customers.

Figure 2:
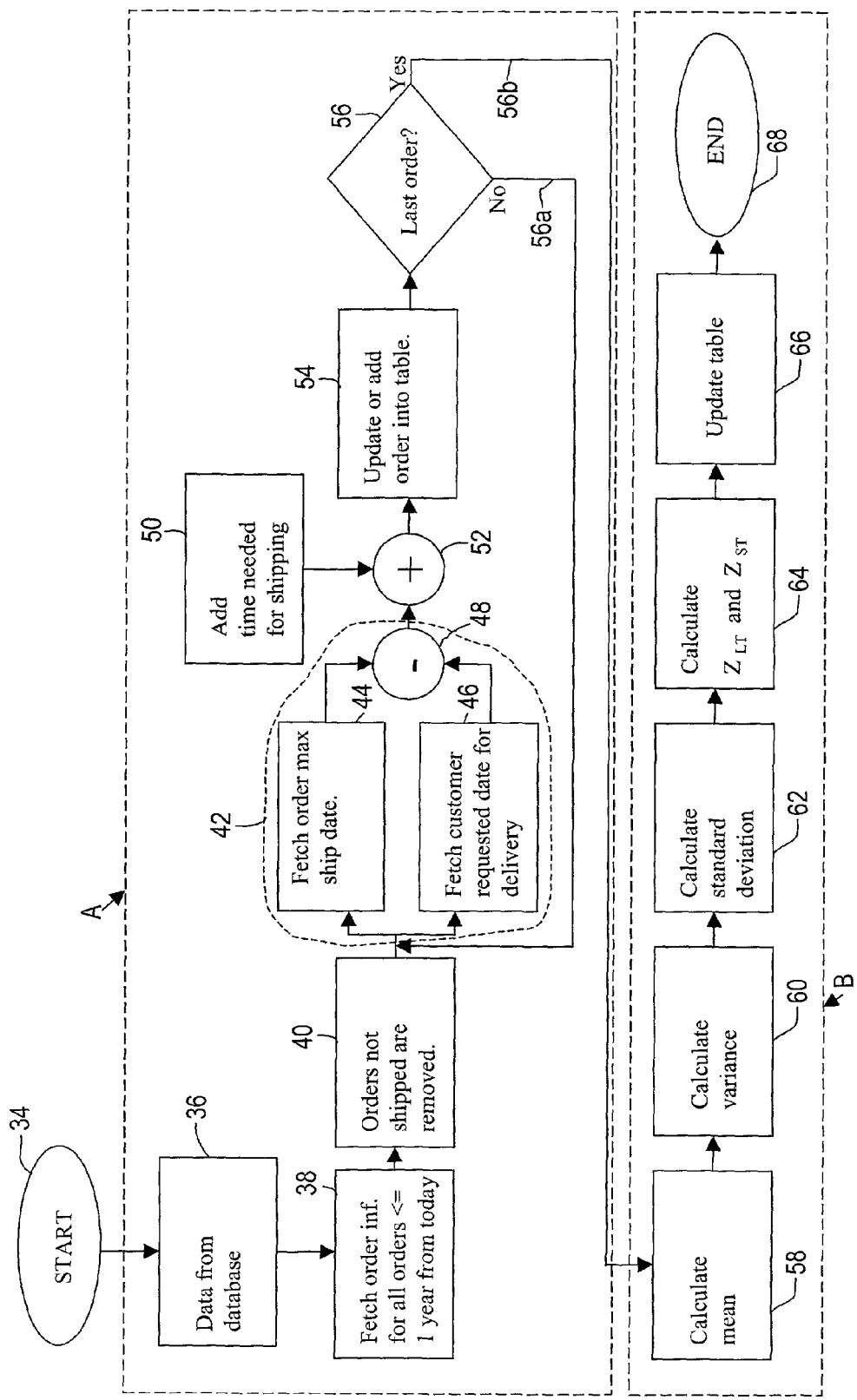
FIG. 2 is a flow chart representation of a process to display quality indicators in accordance with one aspect of the invention.

FIG. 2 is a representation of a preferred embodiment for the statistical prediction of future performance process. In general, a process can be measured for performance if certain specification limits are set to measure it. To do so, the system must determine how many times the process produces a defect, or an output, that does not conform to the specifications that were set, as compared to how many times it produces a non-defect, or a successful output, within a given number of opportunities. In this manner, it is possible statistically to predict the output of a process by sampling performance of the process and analyzing that data. The process can then be assessed and adjusted to improve future performance as against the specification limits.

Still referring to FIG. 2, the flowchart provides a description of a preferred process for creating the statistical calculation to indicate quality. FIG. 2 is divided into two separate parts. Part A describes updating the temporary tables 30 in the database 14, and Part B describes the process flow of the statistical calculation.

Now referring to FIG. 2, Part A, in more detail, upon initialization of the updating process 34, data from the database 36 is obtained by a fetch order for information 38. This is sometimes referred to as querying the database. In this embodiment, the data obtained is only for the orders that have occurred within the past year for statistical purposes. However, any time period can be chosen based on design choice. In the next step orders that have not been shipped are removed from consideration 40 because this portion of the system is only concerned with shipped orders. Next, the initial calculation 42 is performed which requires fetching the maximum ship date from that order at 44 and fetching the customer's requested date for delivery 46. In this embodiment, each order may have more than one product, and the maximum ship date referred to in 44 is the date that the last product on the order was actually shipped. The customer requested date for delivery 46 is subtracted 48 from the maximum ship date 44. At this point, the process adds 52 the time needed for shipping the product to the customer 50 to the difference between the maximum ship date and the customer's requested date for delivery providing the result to update the table 54. Updating the information in the table or providing a new entry then modifies the table. The process then checks whether the last order was processed 56, and if not 56a, the process returns to the initial calculation step 42 where the previously-described process is repeated on the next order entry. If the order is the last 56b, then the process continues to the statistical calculation section of part B. It is important to note that the invention anticipates the use of any number of statistical calculations to predict the capability of a process, both known and as yet unknown. The preferred embodiment uses a value known as the "Z" score to provide information about process capability.

To calculate the mean 58, the data is added together and divided by the number of entries. In statistical equations the mean is customarily represented by the Greek letter mu ($\mu$). The next act in the process is to calculate the variance 60. As is well known in the art, the variance is calculated by subtracting the mean from each entry in the table to determine a deviation for each entry, squaring each deviation, summing the squared deviations, and dividing that sum by the number of entries. The Greek letter sigma $\sigma$ represents variance when shown with an exponent of 2 (i.e., $\sigma^2$). The next act is to calculate the standard deviation 62. This calculation is also well known in the art, and it is equal to the square root of the variance. The standard deviation is traditionally represented by the Greek letter sigma (σ) with an exponent of 1. The next step is to determine the values for Z long-term and Z short-term 64. In general, Z-scores are well known in the art of statistics. Z long-term ($Z_{LT}$) is calculated from the standard deviation and the average output of the current process. Used with continuous data, $Z_{LT}$ represents the overall process capability and can be used to determine the probability of out-of-specification parts within the current process. Usually process capability is measured in defective parts per million opportunities, or DPMO.

In the preferred embodiment, the Z score is determined by first setting an upper specification limit (USL) and a lower specification limit (LSL), also referred to as tolerance limits. These limits are designated either arbitrarily, or as a result of researching customer needs, to determine the goals or tolerance of the process. As a measure of quality, any data point that falls outside of the USL and LSL is then considered a defect. The Z long-term ($Z_{LT}$) value is then calculated by use of the formula:

$$Z_{LT} = \min\left[\frac{USL - \mu}{\sigma}, \frac{\mu - LSL}{\sigma}\right],$$

where USL is the preset upper specification limit, LSL is the preset lower specification limit, μ is the mean, and σ is the standard deviation. In the preferred embodiment, the minimum result of the two expressions is taken as the measure of performance for the process. The user may then interpret the result. Interpretation may include applying the result to a normal or other distribution to determine the percentage of defects produced with a given number of opportunities. It is contemplated and believed within the scope of the present invention that interpretation of the results to determine DPMO could be easily automated as well. Z values can also be calculated in other ways; for example, both expressions can be used in some calculations instead of using the minimum of the two.

Continuing with the preferred embodiment, the $Z_{LT}$ value is then used to determine the Z short term (ZST) value by using the formula: $Z_{ST}=Z_{LT}+1.5$. This is an estimation of performance based upon the idea that the performance of a process will deteriorate over time. Thus the short-term performance represented by the Z score should be better than the long-term performance, and adding 1.5 to the long-term Z score estimates the short-term Z score. The Z scores are then moved to the update table 66 where they can be called for display. In the preferred embodiment, Z short term ($Z_{ST}$) is the standard scale for reporting performance quality based on a target goal of 6 Sigma (If $Z_{ST}$=6 then DPMO=3.4). At this point the process ends 68.

Accordingly, the present invention includes a method for measuring product shipment process capability that includes maintaining a database having therein data fields indicative of at least an order, a maximum ship date, a customer requested data, and a product category for each order, and then fetching order information for all orders that have a valid maximum ship date. The method includes subtracting the customer requested date from the maximum ship date and producing a difference value therefrom. Next, a predetermined number of days is added to the difference value to provide a shipment quality metric for each order. The method next includes using the shipment quality metric in a statistical calculation to indicate process quality.

In a preferred embodiment, the order information fetched from the database is only for those orders that were placed within a given time period. The statistical calculation can include determining a value for an upper specification limit and a lower specification limit, and then displaying the percentage of times the shipment quality metric was greater than the upper specification limit and displaying the percentage of time the shipment quality metric was less than the lower specification limit. The invention can include setting a value for at least one specification limit and computing and displaying a statistical score based upon the specification limit and the shipment quality metrics where the statistical score is a measure of process capability. The process includes periodically repeating the fetching, subtracting, adding shipping days, and determining a statistical calculation at regular time intervals. The statistical calculation is preferably calculated and displayed for each product category. Further, the Z values can be displayed on a scale representing a range of Z values with an overlapping needle to indicate current performance as will be discussed later in reference to FIG. 7.

The invention also includes a computer program implementing the aforementioned method. The computer program is stored on a computer readable medium and causes one or more computers to query a database that contains the information detailing orders, a requested delivery date, a maximum ship date, and a product category for a number of products. In processing the data, the computers are caused to ignore orders with no maximum ship date, and subtract the requested delivery date from the maximum ship date and add an adjustment value to obtain a shipment quality metric. The query, subtraction, and addition acts are repeated for the number of shipped products, and the computer program has instructions to process the shipment quality metrics to determine overall shipment quality.

Preferably, the shipment quality metrics are processed to provide a statistical measure of process capability and are regularly reprocessed by repeating the aforementioned acts at regular time intervals. The regular time intervals are dependent upon the system being evaluated and are preferably set such that the user of the system perceives that the shipment quality metrics are updated in real-time.

Preferably, the set of instructions in the computer program that process the shipment quality metrics includes instructions to determine a mean and a standard deviation of the shipment quality metrics, and to designate an upper and lower specification limits, and then to determine a Z long-term value by subtracting the mean from the upper specification limit and dividing the result by the standard deviation. The Z long-term value is then displayed. Further instructions can includes an estimated value for Z short-term by adding a constant to the Z long-term value.

Another embodiment of the invention includes a computer data signal representing a sequence of instructions that, when executed by a processor, cause the processor to maintain a database of data having therein an order number, a promise date, a request date, a maximum ship date, and a product category for each product. The instructions in the computer data signal cause the processor to obtain the data from each order that has a valid maximum ship date and create an upper specification limit by adding a predetermined number of days just prior to a customer's requested delivery date and to create a lower specification limit by adding a predetermined number of days after a customer's requested delivery date. The processor is then caused to compute and display a statistical value providing an indication of process capability. These instructions are periodically repeated either at regular time intervals, in real-time, or on a on-demand basis that can include recalculating the statistical value each time a user requests the information. In order to calculate the statistical value, the computer data signal preferably has instructions to determine a mean value and a standard deviation and to subtract the mean value from the upper specification limit and divide a result by the standard deviation to create a first Z-value. The lower specification limit is subtracted from the mean value and the result is divided by the standard deviation to create a second Z-value. The minimum of the two values is then chosen as the statistical value.

The computer data signal can also have instructions to project what the number of defects would be, given one million opportunities. The defects per million (DPM) is based upon a normal distribution. Applying the $Z_{LT}$ or $Z_{ST}$ to a normal distribution table provides the predicted DPM. While the current preferred embodiment does not describe a method to do this electronically, it can easily be done by the use of a simple look-up table, well known in the art of computer programming. The $Z_{LT}$ or $Z_{ST}$ value is found on the table and the associated DPM value is obtained. The DPM value is then displayed as the number of defects per one million opportunities. The instructions in the computer data signal can also cause a processor to decide which of the first and second Z-values are a minimum value and then to display the minimum value identified as a Z long-term value. A constant can then be added to the Z long-term value to determine and display a Z short-term value.

Figure 3:
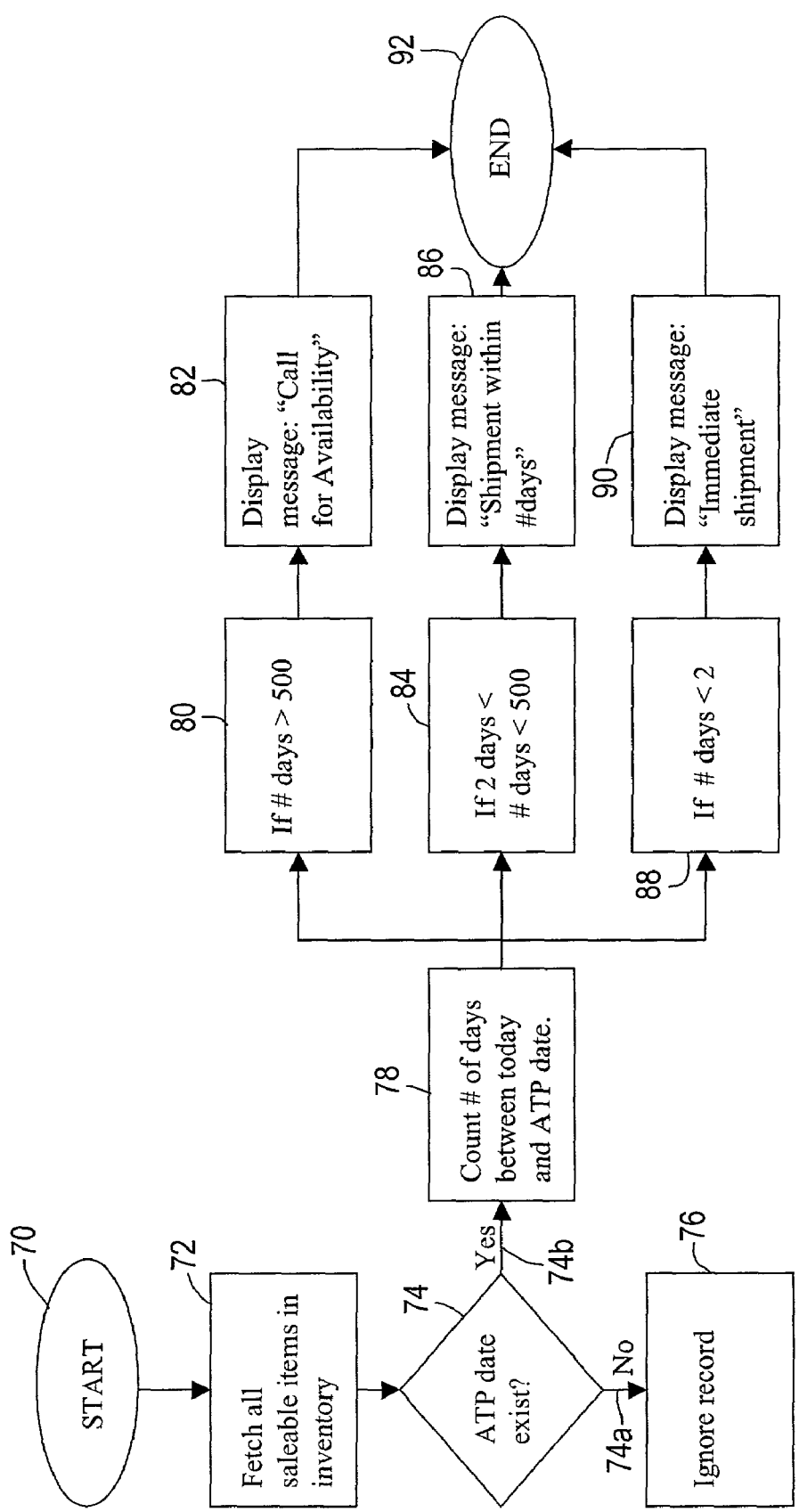
FIG. 3 is a flow chart representation of the availability reporting process in accordance with another aspect of the invention.

FIG. 3 is a flow diagram of the process of a preferred embodiment for displaying inventory availability. The process begins at the start step 70 and the first step is to fetch all saleable items in the inventory 72 from the database. The program then must determine whether each record contains a date indicative of whether the product is available to ship, referred to as an available to promise (ATP) date 74. If a particular record does not have an ATP date 74a, the record is ignored 76. If it does have an ATP date 74b, then the process next counts the number of days between a current date (i.e., typically today) and the ATP date at 78. The resulting number is then provided to the next part of the process to determine which of the messages is appropriate to display for this record. If the number of days between the current date and the ATP date is greater than 500 days 80, then the message "Call for Availability" is displayed 82. If the number of days between the current date and the ATP date is greater than 2 days and less than or equal to 500 days 84, then the message "Shipment within number where number is the number of days between the current date today and the ATP date days" 86 is displayed. On the other hand, if the number of days between the current date today and the ATP date is less than or equal to two 88, then the message "Immediate Shipment" is displayed 90. Once the appropriate message is displayed, the process ends for that entry at 92.

Figure 4:
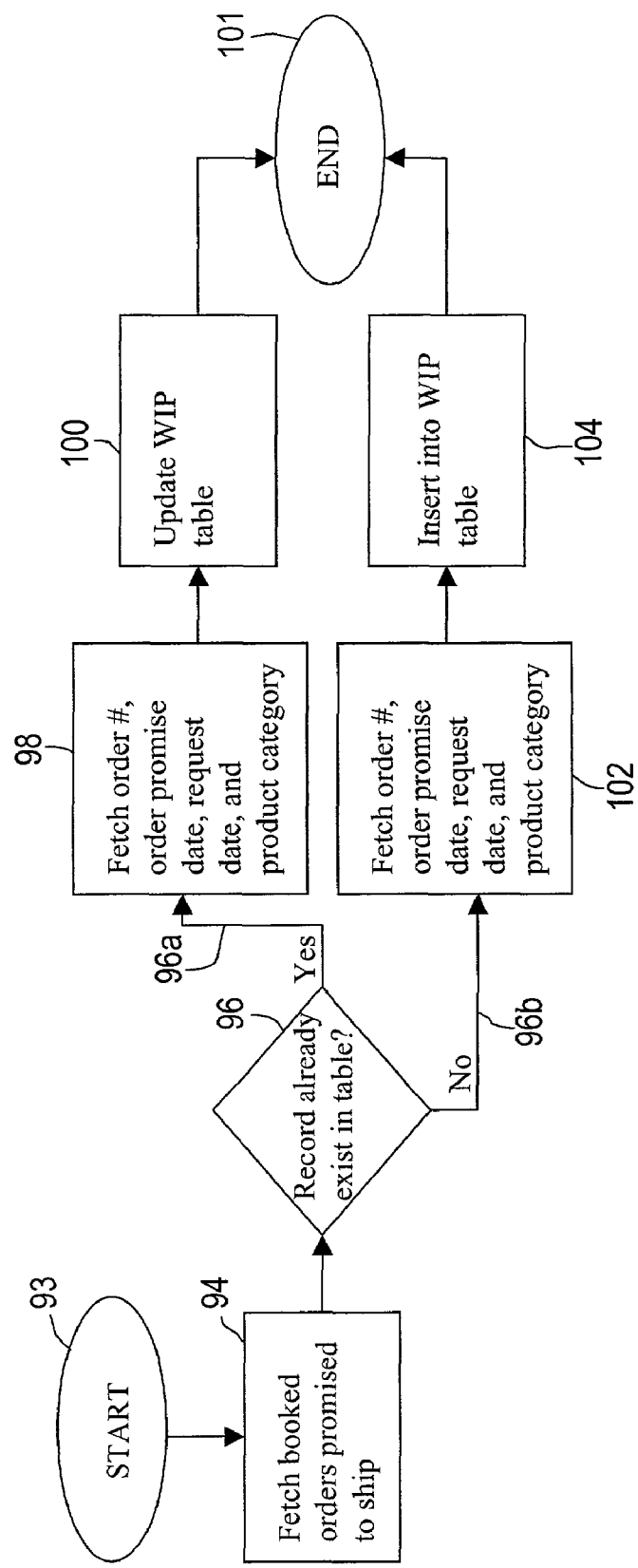
FIG. 4 is a flow chart representation of the work in progress table update process in accordance with another aspect of the invention.

FIG. 4 is a flow diagram representing the work in progress (WIP) table update process for one preferred embodiment. The process updates the WIP table that is in the temporary tables of the database to ensure the data displayed is the most current available. The process begins after initialization 93 by fetching booked orders that have been promised a shipping date 94. The system then determines whether the record already exists in the current WIP table 96. If the record already exists 96a, the order number, order promise date, request date, and the product category are fetched 98, and they are used to update the current entry in the WIP table 100. This portion of the process is then complete at 101. If the record does not exist 96b, the order number, order promise date, request date, and the product category are fetched 102, and are used to create a new entry in the WIP table 104. This portion of the process is then complete at 101. The entire process repeats until all the entries for the WIP table have been either updated or created.

Figure 5:
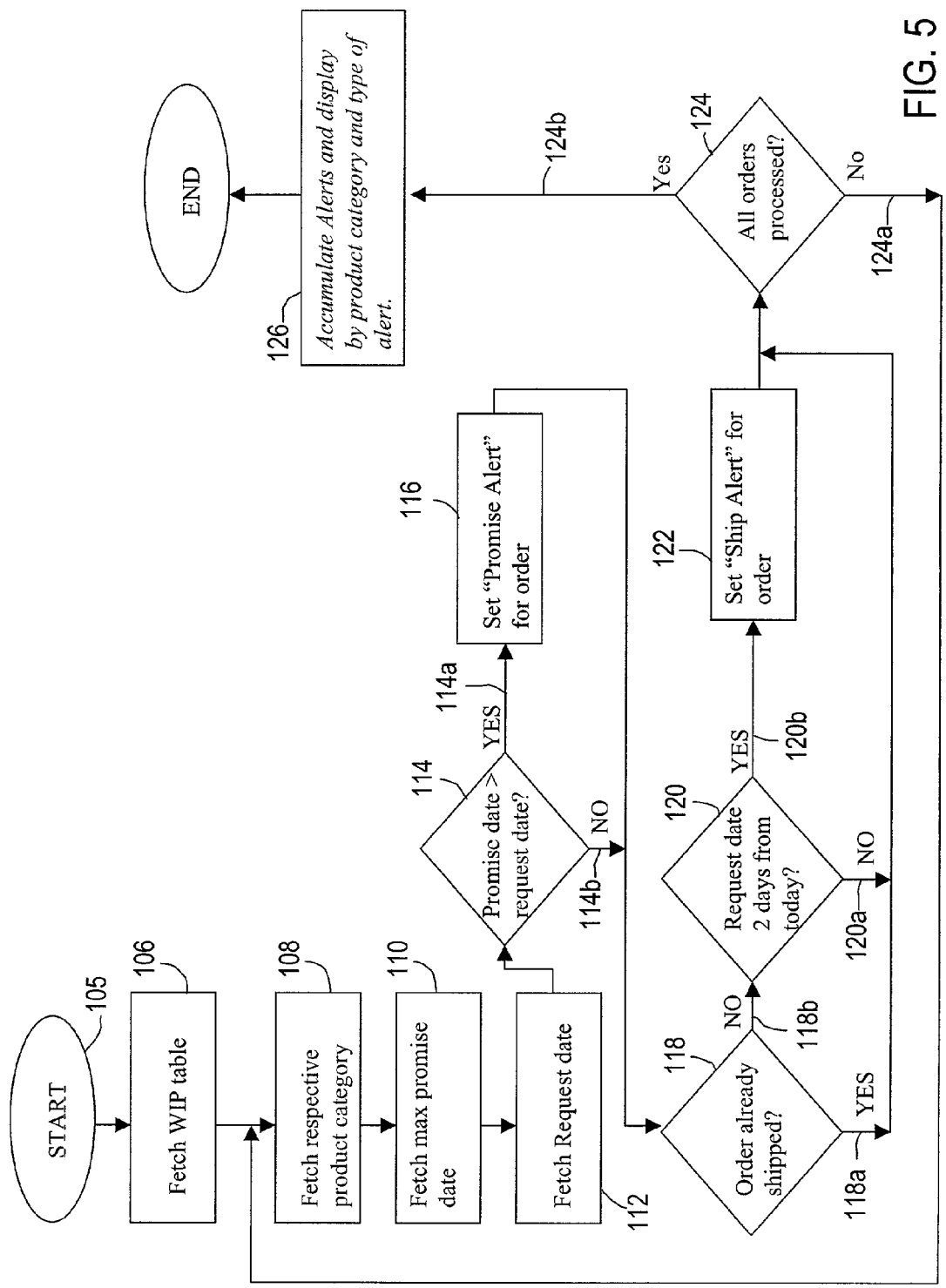
FIG. 5 is a flow chart representation of the shipment and promise alert setting and display process in accordance with another aspect of the invention.

FIG. 5 is a flow chart representing the alert setting and display process. The system provides for both proactive and reactive alerts, allowing use of the information to repair problems in the shipping process. The word "proactive" is meant to show that an alert may be set while there is still time to rectify a possible problem in the process, in this case, shipping. The proactive alert allows the process owners to make adjustments or take special action in order to avoid a late shipment. The reactive alert may not provide the same information, but the information is still useful to ensure that recognized problems do not occur.

Continuing with FIG. 5, the alert setting and display process begins after an initialization 105, by fetching the WIP table 106 and then processing with each order in the WIP table. The program fetches the respective product category 108 and then the maximum promise date 110. The maximum promise date is the latest date promised to the customer for shipment. The request date is then fetched 112, and then the process determines whether the promise date is after the request date 114. If the promise date is later than the request date 114a, then a "Promise Alert" is set and displayed for that order 116, and the process moves to the order already shipped question 118. If the maximum promise date is prior to the request date 114b, then the process skips the promise alert step 116 and moves directly to the order already shipped 118 determination. If the order has already been shipped 118a, the process moves directly to check to see if all the orders have been processed at 124. If not 118b, the process then determines whether the request date is within a preset number of days from a current data 120. In this embodiment, the preset number of days is two. If the request date is not within two days of the current date 120a then the process moves to check if another order must be processed at 124. If the request date is within two days of the current date 120b, then the "Ship Alert" is set and displayed 122, and the process moves to check if all the orders have been processed 124. The process then repeats for all orders 124, 124a. Once all of the orders have been processed 124b, the alerts are accumulated and displayed for the individual orders sorted by product category and type of alert 126. The alerts provide opportunities for management to fix problems before they happen.

FIG. 6 is a representation of the process used to display the orders and revenue for a past period of time. The process is initiated automatically when the information is requested, or on a regular pre-programmed basis 127. In a preferred embodiment, all of the order information, including revenue for each order, is retrieved from the database 128. The program then captures all the orders 130 in a previous period of time, in this example, a last year. The Orders table is then updated 132 with the data from the capture 130. At this point the orders in the table are sorted by month and category 134. The last step provides that the orders, order totals, revenue and revenue totals are displayed in tabular format 136 for viewing in an easily understandable way. After all the orders are displayed the process is completed at 138.

FIG. 7 is a representation of a Z-value graphic indicator 140 in accordance with another aspect of the invention. The ranges of values on the scale 142 change automatically to best reflect the value to be indicated, and a needle 144 indicates the value of the current calculation.

Each of the processes just described can be used alone, or in conjunction with each other in various combinations. In one preferred embodiment, the reports are displayed on a number of web pages within an intranet system. It is automatically updated and the information is available 24 hours a day on an as-needed, on-demand basis.

The present invention has been described in terms of the preferred embodiment. While the preferred embodiment uses computers that are communicating through some form of a network, it is understood that other embodiments of the invention may involve the use of different technologies. It is recognized that equivalents, alternatives and modifications that are different from the preferred embodiment exist, and they are within the scope of the appending claims.

The invention claimed is:

1. A method for measuring product shipment process capability, comprising:
   maintaining a database that contains fields indicating at least an order, a max ship date, a customer requested date, and a product category for each order;
   fetching order information for all orders that have a valid max ship date;
   subtracting the customer requested date from the max ship date producing a difference value;
   adding a predetermined number of days to the difference value providing a shipment quality metric for each order; and
   determining a statistical calculation to indicate process quality using the shipment quality metric wherein the steps of maintaining, fetching, subtracting, adding and determining are performed by a computer.

2. The method of claim 1 wherein the order information fetched from the database is only for those orders that were placed within a given time period.

3. The method of claim 1 further comprising:
   determining a value for an upper specification limit and a lower specification limit;
   displaying a percentage of times the shipment quality metric was greater than the upper specification limit; and
   displaying a percentage of times the shipment quality metric was less than the lower specification limit.

4. The method of claim 1 further comprising:
   setting a value for at least one specification limit; and
   computing and displaying a statistical score based upon the specification limit and the shipment quality metrics, wherein said statistical score is a measure of process capability.

5. The method of claim 4 wherein the statistical score is calculated by using a formula given by:

$$Z_{LT} = \min\left[\frac{USL - \mu}{\sigma}, \frac{\mu - LSL}{\sigma}\right].$$

6. The method of claim 5 wherein the method further comprises determining Z short-term by use of the formula $Z_{ST} = Z_{LT} + 1.5$.

7. The method of claim 6 wherein the method further comprises graphically displaying the $Z_{ST}$ value by displaying a range of values with an overlapping needle to indicate current performance.

8. The method of claim 5 wherein the method further comprises displaying said $Z_{LT}$ value by displaying a scale representing a range of values for $Z_{LT}$ with an overlapping needle to indicate current performance.

9. The method of claim 1 wherein the steps following maintaining the database are repeated at regular time intervals.

10. The method of claim 1 wherein the statistical calculation is calculated and displayed for each product category.

11. A non-transitory computer-readable medium having stored thereon one or more computer programs having a set of instructions that, when executed by one or more computers, causes the one or more computers to:
    query a database that contains information detailing orders, a requested delivery date, a max ship date, and a product category for a plurality of products;
    ignore orders with no max ship date;
    subtract the requested delivery date from the max ship date and add an adjustment value to obtain a shipment quality metric;
    repeat the query, subtraction, addition acts for a plurality of shipped products; and
    process the shipment quality metrics to determine overall shipment quality.

12. The computer-readable medium of claim 11 wherein the shipment quality metrics are processed to provide a statistical measure of process capability.

13. The computer-readable medium of claim 11 wherein the shipment quality metrics are regularly re-processed by repeating the acts of claim 11 at regular time intervals.

14. The computer-readable medium as in claim 13 wherein the regular time interval is substantially real-time as perceived by a user.

15. The computer-readable medium of claim 11 wherein processing the shipment quality metrics is accomplished by a set of instructions that, when executed by one or more computers, causes the one or more computers to further:
    determine a mean of the shipment quality metrics;
    determine a standard deviation of the shipment quality metrics;
    designate an upper specification limit (USL) and a lower specification limit (LSL) for the shipment quality metrics;
    determine a Z long-term value by subtracting the mean from the upper specification limit and dividing the result by the standard deviation; and
    display the value of Z long-term.

16. The computer-readable medium of claim 15 having further instructions to determine an estimated value for Z Short Term by adding a constant to the Z long-term value.

17. A non-transitory computer readable medium including a sequence of instructions that, when executed by one of more processors, cause the one or more processors to:
    maintain a database of data indicating an order number, a promise date, a request date, a max ship date, and a product category for each product;
    obtain the data from each order that has a valid max ship date;
    create an upper specification limit by adding a predetermined number of days just prior to a customer's requested delivery date;
    create a lower specification limit by adding a predetermined number of days after a customer's requested delivery date; and
    compute and display a statistical value providing an indication of process capability.

18. The non-transitory computer readable medium of claim 17 wherein the computer data signal contains further instructions to repeat the instructions of claim 17 at regular time intervals.

19. The non-transitory computer readable medium of claim 17 wherein the information is updated and the statistical value is recalculated every time a user requests the information.

20. The non-transitory computer readable medium of claim 17 having instructions to:
- determine a mean value and a standard deviation;
- subtract the mean value from the upper specification limit and divide a result by the standard deviation to create a first Z-value;
- subtract the lower specification limit from the mean value and divide a result by the standard deviation to create a second Z-value; and
- choose a value that is a minimum of the first and second Z-values.

21. The non-transitory computer readable medium of claim 20 wherein the instructions cause the one or more processors to further:
- decide which of the first and second Z-values are a minimum value; and
- display the minimum value first and second Z-values identified as Z long-term.

22. The non-transitory computer readable medium of claim 21 wherein the instructions cause the one or more processors to further:
- add 1.5 to the minimum value and display it as Z short-term.

23. The non-transitory computer readable medium of claim 17 wherein the statistical value calculated and displayed is a projected defect in parts per million.

24. The non-transitory computer readable medium of claim 17 wherein the statistical value calculated and displayed is a Z long-term value.

25. The non-transitory computer readable medium of claim 17 wherein the statistical value calculated and displayed is a Z short-term value.

26. The non-transitory computer readable medium of claim 17 having instructions to:
- determine a number of times that an actual shipment date was between the upper specification limit and the lower specification limit given a number of opportunities;
- project a number of times that a shipment date would not be between the upper specification limit and the lower specification limit given one million opportunities; and
- display the projected number as defects per one million opportunities.

27. A non-transitory computer readable storage medium having a computer program stored thereon which, when executed by a processor, causes the processor to:
- acquire a requested delivery date and a shipped date of a number of customer orders from a database;
- calculate a shipment metric mean value and standard deviation from the dates;
- establish an upper specification limit and a lower specification limit;
- calculate a first Z value by subtracting the mean value from the upper specification limit and dividing by the standard deviation;
- calculate a second Z value by subtracting the lower specification limit from the mean value and dividing by the standard deviation; and
- determine a long term process capability value by selecting a minimum of the first Z value and the second Z value.

* * * * *